Feb. 12, 1935.  W. RAUTENSTRAUCH  1,991,173
VALVE
Filed July 7, 1933
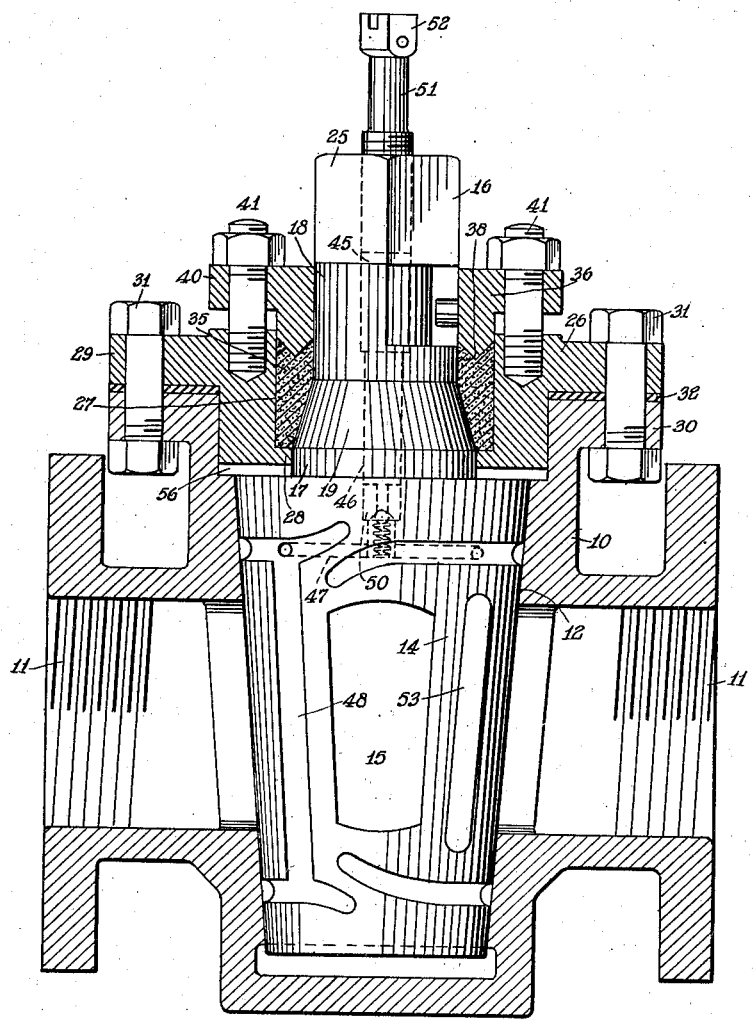

Patented Feb. 12, 1935

1,991,173

UNITED STATES PATENT OFFICE 1,991,173

VALVE

Walter Rautenstrauch, Palisade, N. J., assignor to The Dorin Corporation, Union City, N. J., a corporation of New Jersey Application July 7, 1933, Serial No. 679,269

8 Claims. (Cl. 251—103)

This invention relates to valves and more particularly to valves of the tapered plug type and to an improved stuffing box therefor.

An object of the invention is to reduce the end thrust of the plug in a valve of the above type.

Another object is to reduce the pressure applied to the packing due to the end thrust of the plug.

Another object is to provide a stuffing box adapted to maintain a seal during normal operation of the valve.

A further object is to provide a convenient and dependable device of the type above indicated.

The invention also consists in certain new and original features of construction and combinations of parts hereinafter set forth and claimed.

Although the novel features which are believed to be characteristic of the invention will be particularly pointed out in the claims appended hereto, the invention itself, as to its objects and advantages and the manner in which it may be carried out, may be better understood by referring to the following description taken in connection with the accompanying drawing forming a part thereof in which:

The figure is a vertical section of a valve illustrating one embodiment of the present invention.

Referring to the drawing more in detail, the invention is shown as applied to a valve comprising a housing 10 having ports 11 adapted to receive and discharge fluid and having a tapered valve seat 12 adapted to receive a rotatable valve plug 14. The valve plug 14 is provided with an aperture 15 extending diametrically therethrough which is adapted to interconnect the ports 11 or to close said ports in response to a one-quarter revolution of the plug.

The plug 14 is provided with a valve stem 16 having cylindrical surfaces 17 and 18 interconnected by a tapered surface 19 for the purpose to be described. The valve stem 16 may be provided with a square or other irregular shaped end 25 adapted to receive a tool for operating the valve.

A packing retainer 26 is formed with a cylindrical surface 27 spaced from the tapered surface 19 of the valve stem 16 and with a lip 28 having a running fit with the cylindrical surface 17 of the valve stem 16. The packing retainer 26 is also provided with a flange 29 which may be secured to a flange 30 formed on the housing 10 as by bolts 31. A suitable gasket 32 may be interposed, if required, between the flanges 29 and 30 to effect a tight seal.

The lip 28, tapered surface 19 of the stem 16 and the cylindrical surface 27 of the packing retainer 26 define a stuffing box adapted to receive a suitable packing 35 which may, for example, comprise a plastic molded packing of a type well known in the art. This packing 35 is retained in the stuffing box by means of a gland 36 having a running fit with the cylindrical surface 18 of the stem 16. The gland 36 may be provided with a V-shaped end 38 adapted to engage and to compress the packing. The gland 36 is also provided with a flange 40 which may be secured to the packing retainer 26 by means of bolts 41.

Inasmuch as a valve of this type presents considerable turning friction, it is frequently desirable to provide for lubrication. This may be accomplished, for example, by forming a suitable compartment 45 in the stem 16 which is adapted to receive a lubricant, such as grease. The compartment 45 may be connected by a channel 46 to a transverse channel 47 communicating with grooves 48 which may be formed in the surface of the valve plug in a suitable position to apply the lubricant to the valve seat 12 as the plug is rotated. A one-way valve 50 may be provided at the intersection of the channels 46 and 47 to prevent the lubricant from being forced back into the compartment 45. The lubricant may be forced from the compartment 45 by a suitable plunger 51 which may be threaded into said compartment and may be provided with a square end 52 adapted to receive a turning tool. Certain grooves 53 in the plug 14, which are in positions to pass the ports 11 when the valve plug is operated, are preferably not connected with the channel 47. These grooves pick up lubricant from the valve seat but do not permit the pressure of the lubricant in the compartment 45 to be released when they pass the ports 11.

The packing retainer 26 is so formed as to provide a chamber 56 between the valve plug and the stuffing box. The chamber 56 provides clearance to permit slight longitudinal movement of the plug 14, which may be caused by the longitudinal component of the pressure of the lubricant between the valve plug and the valve seat, and by the longitudinal component of the pressure of the fluid on the valve plug.

It is to be noted that the lip 28 of the packing retainer 26 receives the longitudinal pressure of the packing produced by the gland 36 and prevents this pressure from being applied to the valve plug itself. This permits the necessary pressure to be applied to the packing for maintaining a seal with the valve stem without producing an end thrust on the plug which would tend to interfere with the operation thereof. Furthermore, this pressure is distributed over the entire area of the packing 35, which is in contact with the inclined surface 19 of the valve stem. The inclined surface 19 produces a wedge-shaped stuffing box in which the packing 35 is forced directly against the valve stem by wedging action, caused by longitudinal pressure applied by the gland 36.

Since the lip 28 receives the downward thrust of the packing and prevents the same from being applied to the valve plug, the plug is free to move upwardly to reduce the pressure on the valve seat. The valve thus is adapted to rotate with a minimum of friction and requires a minimum of power for its operation. This materially increases the number of valve operations possible without renewing the lubricant on the valve seat. Furthermore, the chamber 56 permits end play of the valve plug without compressing the packing at one end of the stuffing box. The pressure on the packing due to longitudinal movement of the plug is applied over the entire inclined surface instead of being concentrated on the packing at the end of the stuffing box. The pressure is so distributed that permanent compression of the packing is avoided and the resilience of the packing is sufficient to maintain a tight seal at all times.

While the stuffing box above described is particularly applicable to a valve of the type disclosed herein, it will be understood that the stuffing box may be adapted to various other uses and applications as will be apparent to a person skilled in the art.

Although a specific embodiment of the invention has been disclosed for purposes of illustration, various changes and modifications will be readily apparent. The invention is only to be limited in accordance with the following claims when interpreted in view of the prior art.

I claim:

1. A valve comprising a housing having a valve seat, a rotary valve plug seated therein and having a stem extending through said housing, a stuffing box for said stem associated with said housing, said stem having an inclined packing-engaging surface associated therewith, said inclined surface having a component opposing the end thrust of said plug and being adapted to distribute the longitudinal component of the pressure due to longitudinal movement of said plug over a large area of packing so as to prevent deformation of said packing beyond its elastic limit, and means to apply longitudinal pressure to said packing for effecting a seal between the packing and said inclined surface.

2. A valve comprising a housing having a valve seat, a rotary valve plug seated therein, said plug having a stem extending through said housing and provided with a surface tapered inwardly away from said plug so as to have a small component opposing the end thrust of said plug and a larger radial component, a stuffing box for said stem formed by a packing-retaining member associated with said housing and spaced from said tapered surface to provide a chamber adapted to receive packing, said member having a lip extending into running engagement with said stem for retaining the packing and receiving the longitudinal thrust thereof, and means to apply longitudinal pressure to said packing for forcing the same against said tapered surface.

3. A valve comprising a housing having a valve seat, a rotary valve plug seated therein having a stem extending through said housing, said stem having a pair of cylindrical surfaces joined by a tapered surface adapted to engage packing, said tapered surface being inclined inwardly away from said plug so as to have a small component opposing the end thrust of said plug and a larger radial component, a packing-retaining member associated with said housing, said member having a cylindrical surface spaced from said tapered surface to provide a tapered packing-receiving chamber and having a lip in running engagement with one of said cylindrical surfaces, said lip being adapted to receive the longitudinal thrust of the packing, and a packing gland in running engagement with the other of said cylindrical surfaces, said gland being adapted to apply longitudinal pressure to the packing for causing the packing to effect a seal with said tapered surface.

4. A valve comprising a housing having a valve seat, a plug rotatably seated therein and having a stem extending through said housing, means to apply a lubricant to the contacting surfaces of said plug and said housing, said stem having a slightly tapered surface cooperating with a packing-retaining member to form a stuffing box, said tapered surface being adapted to distribute the longitudinal component of the thrust of the packing over a comparatively large area so as to prevent the packing from being unduly compressed in response to longitudinal movement of said plug, said packing-retaining member having a lip adapted to receive a large part of the end thrust of the packing, and means to apply longitudinal pressure to the packing to thereby effect a seal with said tapered surface.

5. A valve comprising a valve housing having a tapered seat, a tapered plug rotatably seated therein and having a stem extending through said housing, means to apply a lubricant to the contacting surfaces of said plug and said housing, said stem having a surface cooperating with a packing-retaining member to form a stuffing box, said surface being tapered oppositely to said valve seat so as to have a component adapted to oppose the end thrust of said plug, the taper being such that longitudinal movement of said plug exerts relatively slight compressional effect on the packing, and means to apply longitudinal pressure to the packing to thereby effect a seal with said tapered surface.

6. A valve comprising a valve housing having a tapered seat, a tapered plug rotatably seated therein and having a stem extending through said housing, means to apply a lubricant to the contacting surfaces of said plug and said housing, said stem having a surface tapered oppositely to said plug and cooperating with a packing-retaining member to form a stuffing box, said tapered surface being adapted to distribute the end thrust of said plug over a large area of packing so as to prevent the packing from being compressed beyond its elastic limit in response to longitudinal movement of said plug, and means to apply longitudinal pressure to the packing to thereby effect a seal with said tapered surface, said stuffing box being adapted to oppose the end thrust on the plug due to the pressure of said lubricant, said packing-retaining member having a lip extending transversely into said stuffing box to prevent the end thrust of the packing from being transmitted to the end of the plug.

7. In combination, a housing, a shaft extending through said housing and a stuffing box for said shaft associated with said housing and adapted to receive plastic molded packing, said shaft having a surface tapered to provide a component opposing the end thrust and to distribute the end thrust over a large area of packing so as to prevent excessive deformation thereof in response to longitudinal movement of said shaft, and means to apply longitudinal pressure to the packing for thereby effecting a seal between the packing and the tapered surface.

8. In combination, a housing having a shaft extending therethrough, a stuffing box for said shaft associated with said housing, said stuffing box being formed by a tapered surface formed on said shaft and a packing-retaining member carried by said housing and spaced from said surface to form a chamber adapted to receive packing, said tapered surface having a component to oppose the end thrust of said shaft and being adapted to distribute the end thrust over a large area of packing so as to prevent excessive deformation thereof in response to longitudinal movement of said shaft, means to apply longitudinal pressure to said packing, and a lip associated with said retaining member to receive the direct longitudinal pressure of said packing and to thereby prevent said pressure from causing an end thrust on said shaft.

WALTER RAUTENSTRAUCH